(12) United States Patent
Min (10) Patent No.: US 10,495,213 B2
(45) Date of Patent: Dec. 3, 2019

(54) SHIFT LEVER ASSEMBLY

(71) Applicants: Hyundai Motor Company, Seoul (KR); Kia Motors Corporation, Seoul (KR)

(72) Inventor: Jeong Seon Min, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 86 days.

(21) Appl. No.: 15/782,711

(22) Filed: Oct. 12, 2017

(65) Prior Publication Data
US 2018/0347690 A1 Dec. 6, 2018

(30) Foreign Application Priority Data
Jun. 1, 2017 (KR) .................. 10-2017-0068550

(51) Int. Cl.
F16H 59/02 (2006.01)

(52) U.S. Cl.
CPC ... F16H 59/0208 (2013.01); *F16H 2059/026* (2013.01)

(58) Field of Classification Search
CPC ...... F16H 59/0278; B60K 20/02; B60K 20/04
USPC .............. 74/473.3, 473.29, 473.33
See application file for complete search history.

(56) References Cited

U.S. PATENT DOCUMENTS

| | | | | |
|---|---|---|---|---|
| 3,406,586 A * | 10/1968 | Hobbins | ............. | F16H 59/0208 74/473.29 |
| 3,665,776 A * | 5/1972 | Hess | ............. | B60K 20/04 74/473.35 |
| 3,675,881 A * | 7/1972 | Caldwell | ............. | B62D 33/0604 267/141.4 |
| 3,895,408 A * | 7/1975 | Leingang | ............. | F16B 5/0258 16/2.1 |
| 4,282,768 A * | 8/1981 | Osborn | ............. | B60K 20/02 248/603 |
| 4,527,913 A * | 7/1985 | Seifert | ............. | B60K 20/02 384/215 |
| 4,528,863 A * | 7/1985 | Theodore | ............. | F16H 59/0208 74/473.29 |
| 4,606,238 A * | 8/1986 | Ikemoto | ............. | B60K 20/04 248/638 |
| 6,282,973 B1 | 9/2001 | Sander et al. | | |
| 6,510,915 B1 * | 1/2003 | Meyer | ............. | B60K 20/04 180/336 |
| 9,303,667 B2 * | 4/2016 | Morris | ............. | F16B 5/0664 |

(Continued)

FOREIGN PATENT DOCUMENTS

EP 2 776 743 B1 12/2015
JP H06-094108 A 4/1994
(Continued)

*Primary Examiner* — Victor L MacArthur
*Assistant Examiner* — T. Scott Fix
(74) *Attorney, Agent, or Firm* — Morgan, Lewis & Bockius LLP (57) ABSTRACT

A shift lever assembly may include a shift lever housing having a shift lever rotatably coupled thereto in a shift direction, a front and back direction of a vehicle, and a select direction, a left and right direction of the vehicle; a base bracket configured to be coupled to the shift lever housing and fixedly disposed on a vehicle body; and a fastener configured to extend in the shift direction to couple the shift lever housing and the base bracket to each other.

6 Claims, 8 Drawing Sheets

(56) References Cited

U.S. PATENT DOCUMENTS 9,382,935 B2 * 7/2016 Morris .................. F16B 17/006
9,457,845 B2 * 10/2016 Morris .................... B62D 27/02
9,599,279 B2 * 3/2017 Morris ................. F16M 11/041

FOREIGN PATENT DOCUMENTS

| JP | H08-118982 A | 5/1996 |
|----|--------------|--------|
| KR | 20-1999-0031795 U | 7/1999 |
| WO | WO 2013/068187 A1 | 5/2013 |

* cited by examiner

SHIFT LEVER ASSEMBLY

CROSS-REFERENCE(S) TO RELATED APPLICATIONS

The present application claims priority to Korean Patent Application No. 10-2017-0068550, filed on Jun. 1, 2017, the entire contents of which is incorporated herein for all purposes by the present reference.

BACKGROUND OF THE INVENTION

Field of the Invention

The present invention relates to a shift lever assembly, more particularly, to a shift lever assembly for engaging a shift lever housing of a manual transmission among transmissions of a vehicle with a base bracket of a vehicle body.

Description of Related Art

Generally, a transmission for a vehicle is provided between a clutch and a propeller shaft to appropriately shift an engine rotation so that a power of an engine matches a traveling state of the engine, increasing a torque or changing to a high speed rotation, keeping the engine in a no-load state, or reversing a vehicle.

There are two types of transmissions: a manual transmission (MTM) in which a driver makes a manual shift, and an automatic transmission (ATM) in which a shift is automatically made according to the traveling state. An operating mechanism of the transmission includes a direct operation type in which a shift lever is directly mounted in the transmission, and a remote operation type in which the transmission is separated from the shift lever and the transmission is operated by a link, a wire or the like connecting between the transmission and the shift lever.

In particular, since a shift lever is integrally formed in an injection structure, the manual transmission is disadvantageous in terms of interchangeability. However, in recent years, a shift lever housing and a base bracket tend to be separately applied. In the structure of the separable type manual transmission lever, the connection structure between the shift lever housing and the base bracket is very important. However, since the shift lever housing and the base bracket are assembled by a simple bolt and nut assembling method, there is a disadvantage in that the manual transmission lever structure is excessive in the number of components and is vulnerable to vibration and noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift lever assembly configured for reducing the number of components when a shift lever housing and a base bracket are assembled while being robust against vibration and noise.

According to an exemplary embodiment of the present invention, there is provided a shift lever assembly, including: a shift lever housing configured to have a shift lever rotatably coupled thereto in a shift direction, a front and back direction of a vehicle, and a select direction, a left and right direction of a vehicle; a base bracket configured to be coupled to the shift lever housing and fixedly disposed on a vehicle body; and a fastening member configured to extend in the shift direction to couple the shift lever housing and the base bracket to each other.

The fastening member may be a bar-shaped pin in which the front and back direction of the vehicle is a longitudinal direction thereof.

The fastening member may be disposed to have both end portions thereof penetrating through the shift lever housing and the base bracket, respectively, to be supported without a separate fixing member.

The fastening members may be disposed on left and right sides of the shift lever housing and the base bracket while being separated apart from each other by a predetermined distance.

An elastic body may be disposed between the fastening member and the shift lever housing or between the fastening member and the base bracket.

An edge portion of the elastic body may be provided with at least one indentation groove indented inwardly.

The elastic body may be assembled in a pressed state wherein a volume of the body before assembly is larger than that after the assembly.

The elastic body may be provided with a through hole through which the fastening member penetrates. The elastic body may have a rectangular shape in which a round is formed at a vertex side before the assembly, and may be compressed after the assembly to become a circle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a shift lever assembly according to exemplary embodiments of the present invention will be described with reference to the accompanying drawings.

Figure 1:
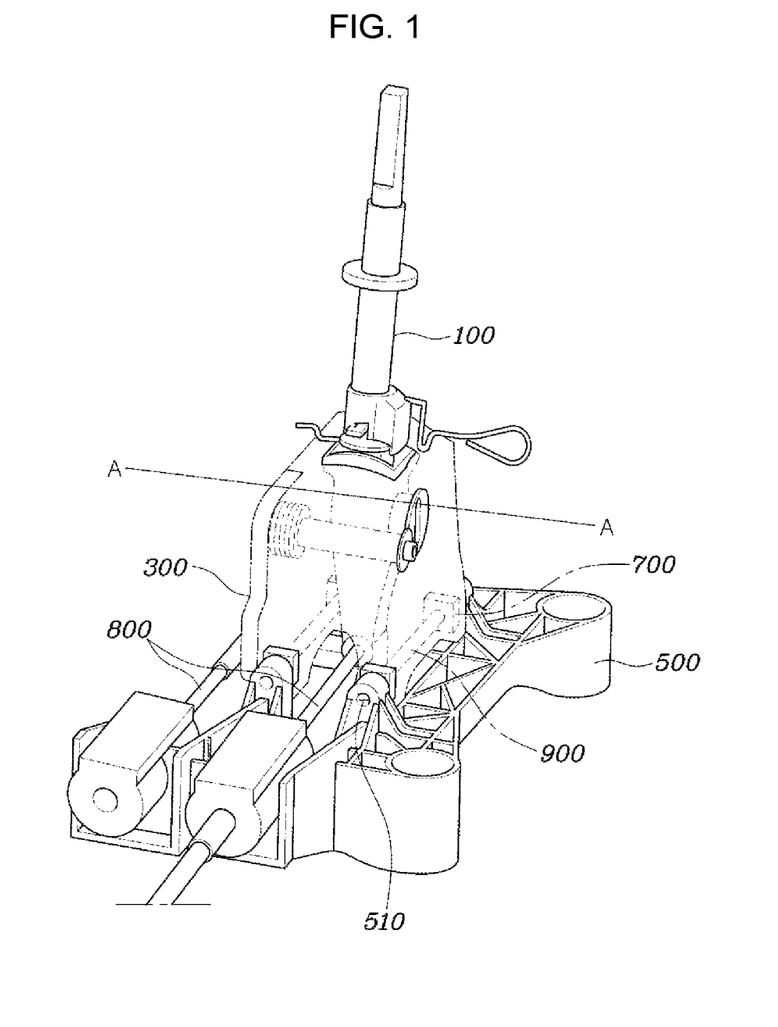
FIG. 1 shows a shift lever assembly according to an exemplary embodiment of the present invention.
Figure 2:
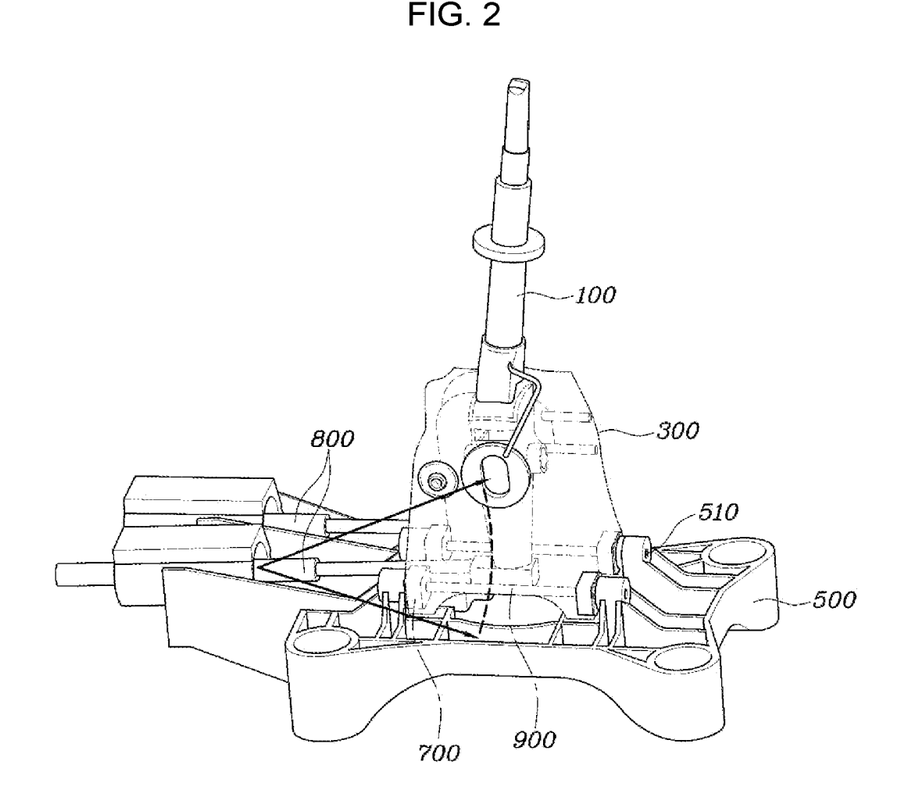
FIG. 2 is a side view of FIG. 1.
Figure 3:
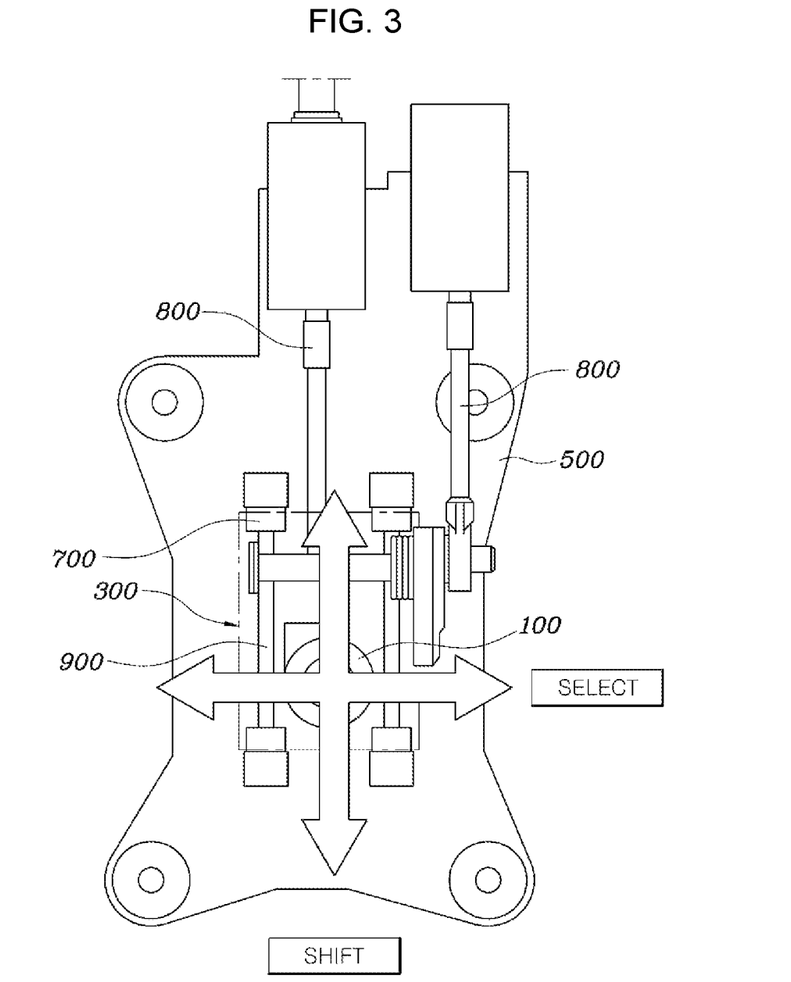
FIG. 3 is a plan view of FIG. 1.
Figure 4:
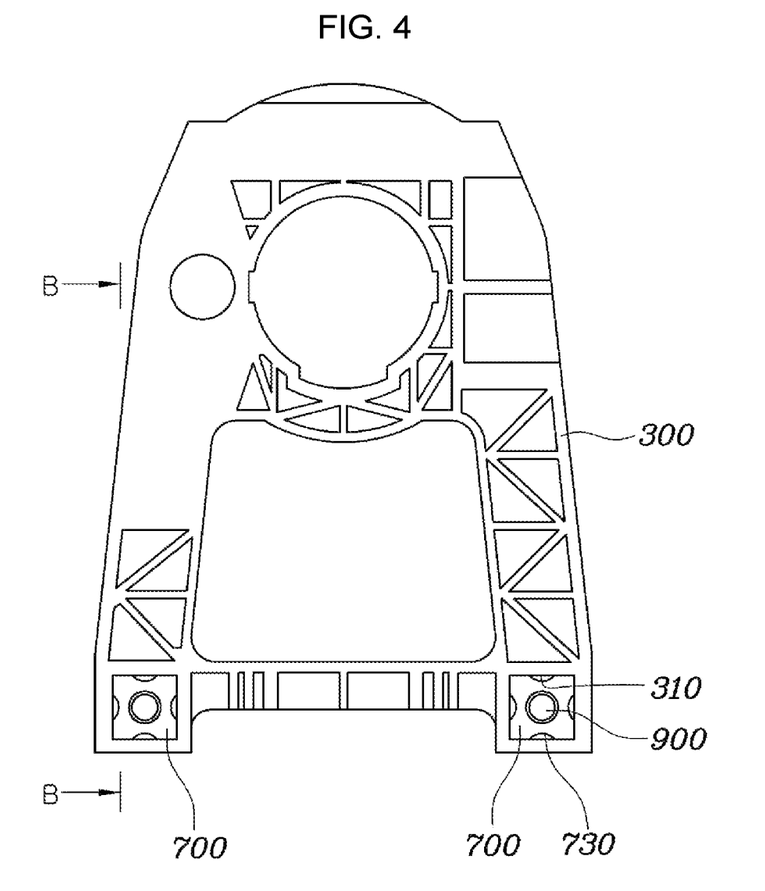
FIG. 4 is a cross-sectional view taken along the line A-A of FIG. 1.
Figure 5:
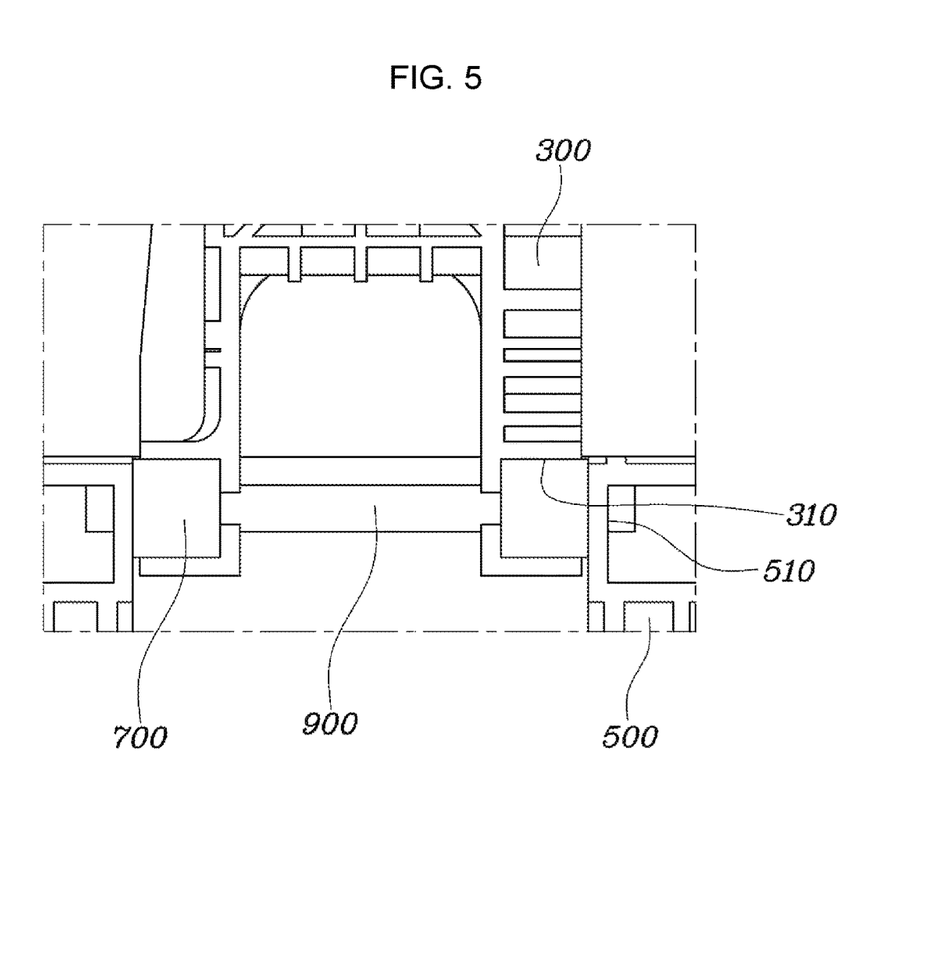
FIG. 5 is a cross-sectional view taken along the line B-B of FIG. 4.
Figure 6:
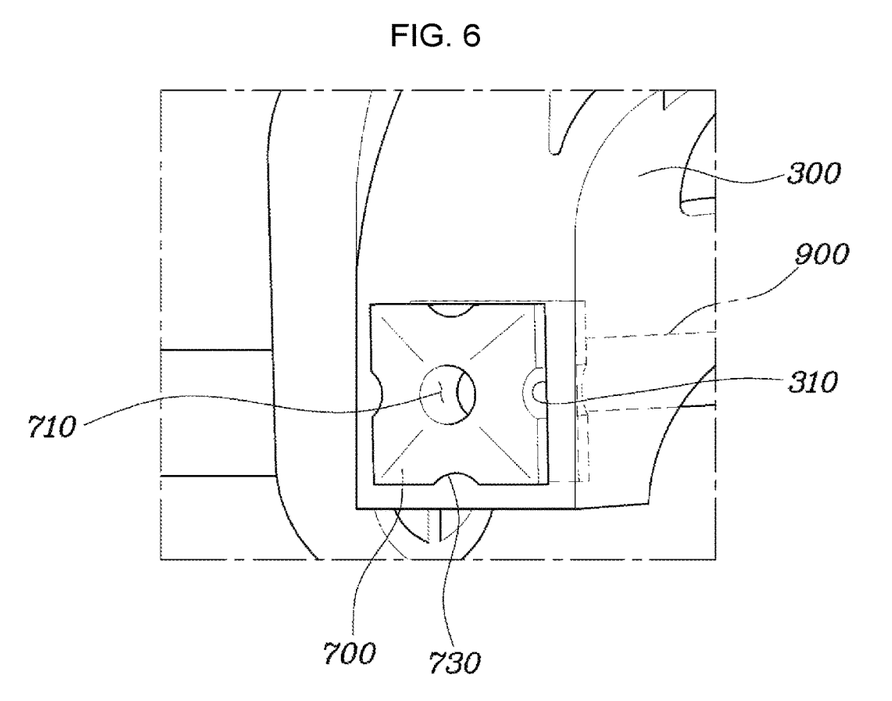
FIG. 6 is a diagram illustrating in detail a coupling portion of FIG. 1.
Figure 7:
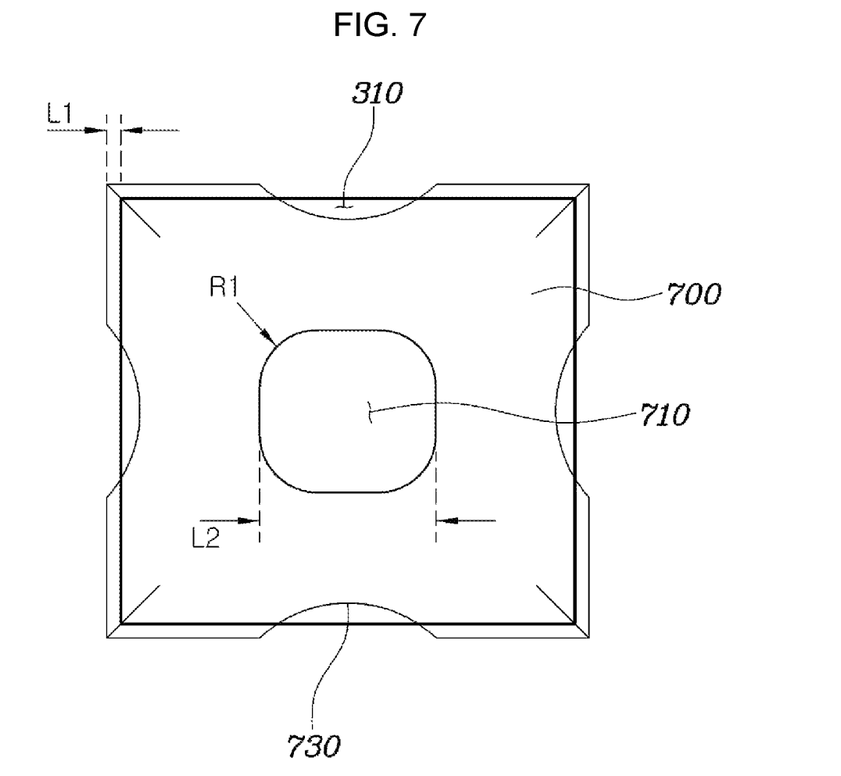
FIG. 7 and FIG. 8 are views showing states before and after an elastic body is inserted into an insertion hole.
Figure 8:
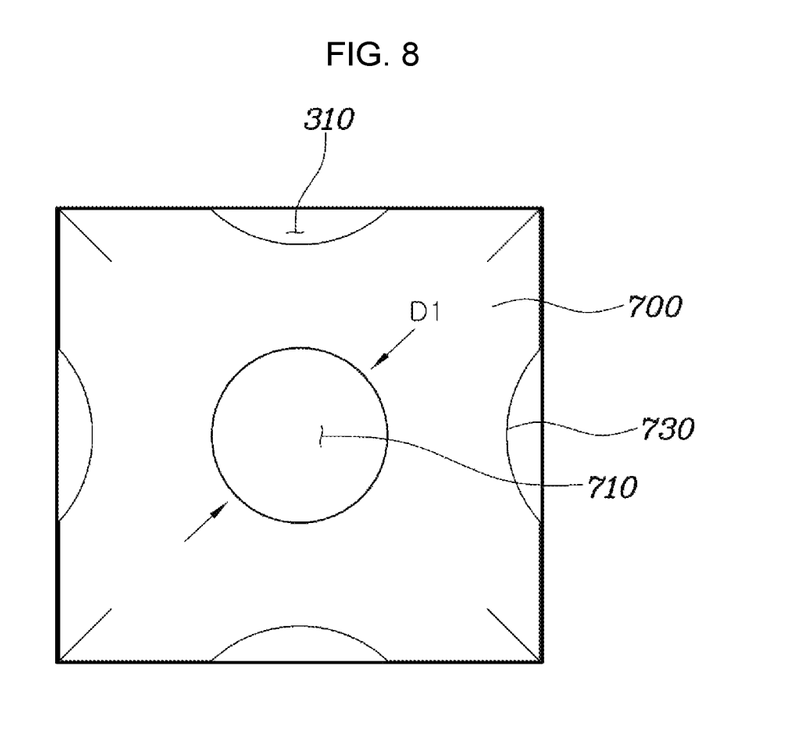

FIG. 1 shows a shift lever assembly according to an exemplary embodiment of the present invention, FIG. 2 is a side view of FIG. 1, FIG. 3 is a plan view of FIG. 1, FIG. 4 is a cross-sectional view taken along the line A-A of FIG. 1, FIG. 5 is a cross-sectional view taken along the line B-B of FIG. 4, and FIG. 6 is a diagram illustrating in detail a coupling portion of FIG. 1. Further, FIG. 7 and FIG. 8 are views showing states before and after an elastic body 700 is inserted into an insertion hole 310.

As shown in FIG. 1, FIG. 2, and FIG. 3, a shift lever assembly according to an exemplary embodiment of the present invention includes a shift lever housing 300 configured to have a shift lever 100 rotatably coupled thereto in a shift direction, a front and back direction of a vehicle, and a select direction, a left and right direction of a vehicle; a base bracket 500 configured to be coupled to the shift lever housing 300 and fixedly disposed on a vehicle body; and a fastening member 900 configured to extend in the shift direction to couple the shift lever housing 300 and the base bracket 500 to each other.

The shift lever housing 300 is provided with a shift lever (100) for shifting the vehicle. A point where the shift lever housing 300 meets the base bracket 500 is provided with the insertion hole 310 which is open in the front and back direction of the vehicle. The insertion hole 310 may be a rectangular shape.

The base bracket 500 is fastened with the shift lever housing 300 below the shift lever housing 300. In the base bracket 500, a position corresponding to the insertion hole 310 of the shift lever housing 300 is provided with the fastening hole 510 which is open in the front and back direction of the vehicle.

The elastic body 700 is disposed between the fastening member 900 and the shift lever housing 300 or between the fastening member 900 and the base bracket 500. The elastic body 700 is inserted into the fastening hole 510. Although the elastic body 700 is shown to be fastened to the fastening hole 510 in the present embodiment, the elastic body 700 may also be disposed in the fastening hole 510 of the base bracket 500, and therefore the disposition location of the elastic body 700 is not limited. The elastic body 700 may include rubber, elastomer, or the like. FIG. 6, FIG. 7, and FIG. 8 show the elastic body 700 in detail. As shown in the drawings, in the elastic body 700 a position corresponding to the fastening hole 510 is provided with the through hole 710, and the through hole 710 is open in the front and back direction of the vehicle. The elastic body 700 may be a bushing. That is, the elastic body 700 is inserted into the insertion hole 310 of the shift lever housing 300, and the fastening hole 510 and the through hole 710 are positioned at the matched point thereof in the state in which the elastic body 700 is inserted into the shift lever housing 300.

The elastic body 700 has a rectangular shape in which each edge portion is larger by L1 than the cross-sectional area of the insertion hole 310, in which each edge portion of the elastic body 700 is provided with at least one indentation groove 730. Forming the indentation groove 730 on a center side of the elastic body 700 may be the most effective for absorbing vibration or impact, but the position of the indentation groove 730 is not limited. At the central side of the elastic body 700, the indentation grooves 730 indented inwardly are formed at one or more edge portions. The indentation groove 730 has a hemispherical shape in which the front and back direction of the vehicle is a longitudinal direction, and is configured to prevent a vibration transmitted during the traveling of the vehicle from being transmitted to the shift lever 100.

Since the elastic body 700 has a cross sectional area larger than that of the insertion hole 310, the elastic body 700 can be assembled in a pressed state. Therefore, a volume before the assembly is larger than that after the assembly. Therefore, the elastic body 700 is press-fitted in the up and down and left and right directions of the vehicle when being inserted into the insertion hole 310, increasing the shift and select rigidity of the shift lever 100. Further, the through hole 710 of the elastic body 700 is formed in a rectangular shape in which a round of R1 is formed on a vertex side has a width of L2 before assembling. However, after the press-fitting, the through hole 710 is compressed to become a circle having a diameter of D1. Therefore, it is possible to realize the quick fastening by pushing the fastening member 900 when the fastening member 900 is fastened, and keep robust fastening to prevent the fastening member 900 from being separated without a separate component.

Further, the fastening member 900 simultaneously penetrates through the fastening hole 510 and the through hole 710 to fasten the shift lever housing 300 with the base bracket 500. The fastening member 900 may be a bar-shaped pin and the fastening member 900 is fastened to the shift lever housing 300 and the base bracket 500 simultaneously by setting the front and back direction of the vehicle to be the longitudinal direction thereof. Therefore, in the manual transmission, the rigidity in the front and back direction of the vehicle which is the shift direction is important at the time of a selection of a speed change stage. In an exemplary embodiment of the present invention, the fastening member 900 is fastened in the front and back direction of the vehicle to match the shift direction, wherein the fastening member 900 supports the rigidity in the shift direction when a user manipulates the shift, securing the rigidity.

The fastening member 900 is disposed to have both end portions thereof penetrating through the shift lever housing 300 and the base bracket 500, respectively. The fastening member 900 is disposed to penetrate through the fastening hole 510 and the through hole 710 to be pressed by the elastic body 700, wherein the fastening member 900 may be supported without a separate fixing member. Therefore, there is an advantage in that the number of components in the structure can be reduced. The fastening members 900 are disposed on the right and left sides of the shift lever housing 300 and the base bracket 500, respectively, to be four-point fastened, wherein the fastening member 900 is formed in a rectangular shape, more stably keeping the fastening secure. Even when the fastening member 900 is pressed downwardly by a user at the time of operation of the shift lever 100, a pressing force is dispersed to four points, wherein the shift lever 100 can be supported more effectively. The fastening members 900 are disposed on the left and right sides of the shift lever housing 300 and the base bracket 500 while being separated apart from each other by a predetermined distance to secure a sufficient fastening region when the shift lever 100 and a transmission cable 800 are assembled, wherein the interference with the fastening member 900 does not occur, facilitating the assembling and increasing production efficiency.

Therefore, according to the shift lever assembly having the structure as described above, the assembling can be made by the method for forming the insertion hole 310 in the shift lever housing 300 in the front and back direction of the vehicle, forming the fastening hole 510 on the base bracket 500 in the front and back direction of the vehicle, and fastening the fastening member 900 after the elastic body 700 provided with the through hole 710 is fastened with the insertion hole 310, minimizing the number of components to save costs, securing the rigidity of the shift and the select by the elastic body 700, and securing the assembly region for assembling the shift lever 100 with the transmission cable 800 to increase the productivity.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever assembly, comprising:
    a shift lever housing having a shift lever rotatably coupled thereto in a shift direction of a front and back direction of a vehicle, and a select direction of a left and right direction of the vehicle;
    a base bracket coupled to the shift lever housing and fixedly disposed on a vehicle body; and
    at least one fastener extending in the shift direction to couple the shift lever housing and the base bracket to each other,
    wherein an elastic body is disposed between the at least one fastener and the shift lever housing or between the at least one fastener and the base bracket, and
    wherein the elastic body is provided with a through hole through which the at least one fastener penetrates,
    wherein the through hole is in a shape of a rounded rectangle before assembly, and the through hole is configured to be compressed into a circular shape after assembly, the rounded rectangle having four rounded corners.

2. The shift lever assembly of claim 1, wherein the at least one fastener is a bar-shaped pin in which the front and back direction of the vehicle is a longitudinal direction thereof.

3. The shift lever assembly of claim 1, wherein the at least one fastener is disposed to have first and second end portions penetrating through the shift lever housing and the base bracket, respectively.

4. The shift lever assembly of claim 1, wherein the at least one fastener is in plural to form a plurality of fasteners and the plurality of fasteners is disposed on a left side of the shift lever housing and the base bracket and a right side of the shift lever housing and the base bracket while being separated apart from each other of the plurality of fasteners by a predetermined distance.

5. The shift lever assembly of claim 1, wherein an edge portion of the elastic body is provided with at least one indentation groove indented inwardly.

6. The shift lever assembly of claim 1, wherein the elastic body is assembled in a pressed state so that a volume of the elastic body before assembly is larger than that after the assembly.

* * * * *